June 8, 1937. V. E. STROUD Re. 20,405
STRAIGHT HOLE DRILLING DEVICE
Original Filed April 29, 1931
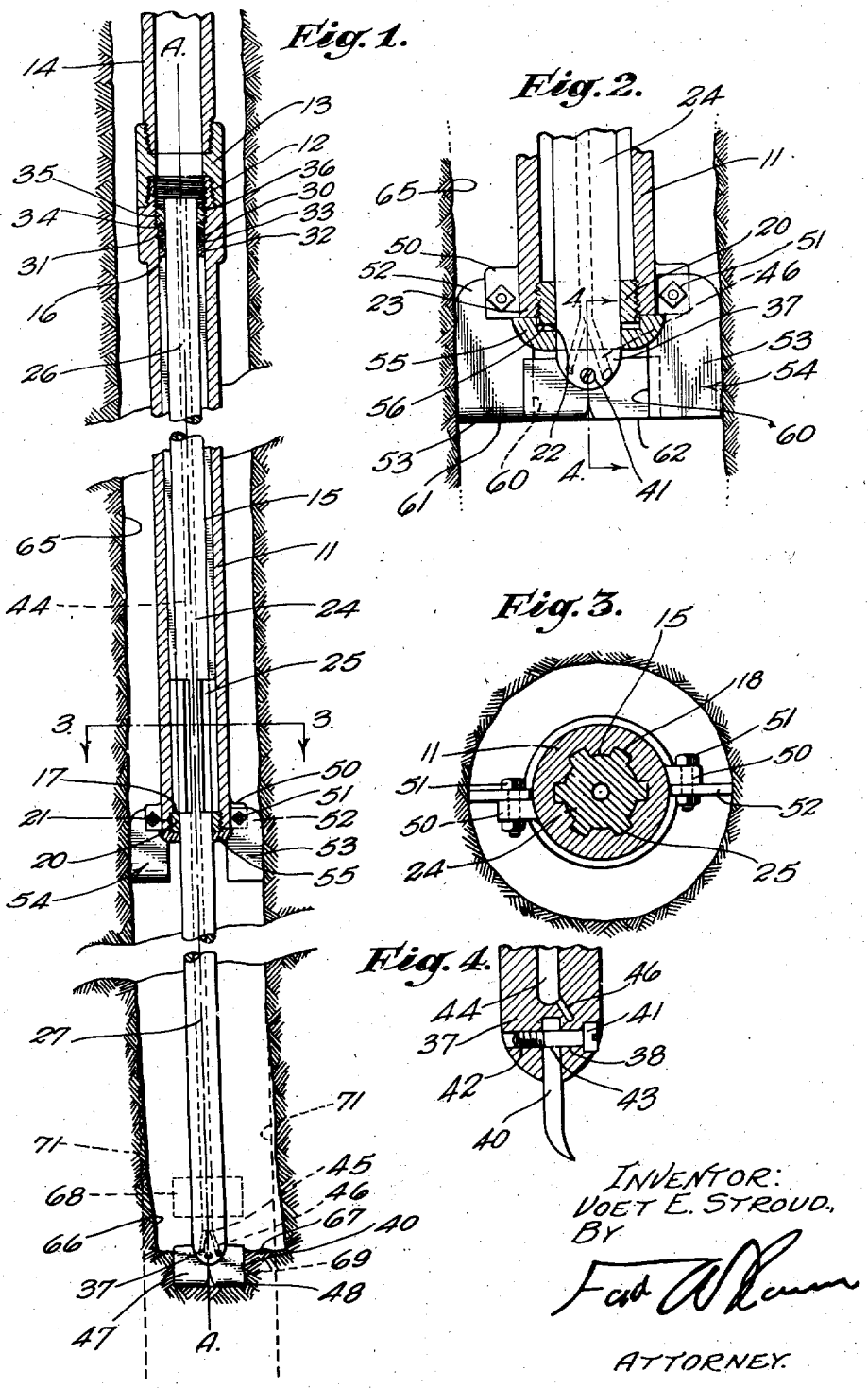
INVENTOR:
VOET E. STROUD,
BY
Fred W. Rauch
ATTORNEY.

Reissued June 8, 1937 Re. 20,405

UNITED STATES PATENT OFFICE 20,405

STRAIGHT HOLE DRILLING DEVICE

Vest B. Stroud, Long Beach, Calif., assignor to [illegible] Oil Tools Company, Los Nietos, Calif., a corporation of California Original No. 1,941,723, dated January 2, 1934, Serial No. 533,678, April 29, 1931. Application for reissue December 28, 1935, Serial No. 56,591

9 Claims. (Cl. 255—61)

My invention relates to well drilling tools and relates more particularly to a drilling device for drilling a straight well bore and for straightening a crooked well bore.

In drilling wells by the rotary method the drill bit is often caused to work to the side so that it drills an inclined or crooked hole. This lateral offsetting of the drill is generally caused by its engagement with inclined strata of earth formation.

It is an object of my invention to provide a well drilling device operable partially or entirely to correct the offsetting of the well bore.

It is another object of the invention to provide a drilling tool embodying a gravity and fluid pressure operated pilot member which may be extended downwardly in advance of the principal or outer cutters to engage the bottom of the well bore and establish an axis of rotation for the outer cutters as they are moved downwardly.

It is another object of the invention to provide a drilling tool adapted to be secured to the lower end of a drilling string of drill pipe and having cutter means secured to its lower end and embodying a shiftable pilot member which may be projected from the outer body of the drilling tool into piloting engagement with the bottom of the well bore.

It is a further object of the invention to provide a drilling tool of the character mentioned having an outer body adapted to support outer cutters and an inner body adapted to support inner cutters, there being a keyed engagement between said outer and inner bodies for permitting the inner body to slide downwardly from a position where said cutters are one within the other to a position of projection from the lower end of the outer body where the inner cutters act in advance of the outer cutters, said keyed engagement at all times causing the inner body to be positively rotated by the outer body.

A further object of the invention is to provide a drilling tool of the character mentioned adapted to employ replaceable cutters.

Further objects and advantages of the invention will be made evident by the following detailed description of a typical embodiment of the invention.

Referring to the drawing, which is for illustrative purposes only,

Fig. 1 is a vertically sectioned view showing a preferred embodiment of my invention and illustrating one manner in which it may be employed in the drilling of a well.

Fig. 2 is an enlarged fragmentary vertical sectional view showing the lower end of the outer tubular member and showing the inner member in elevation in raised position relative to the outer tubular member.

Fig. 3 is an enlarged horizontal cross sectional view taken in the plane represented by the line 3—3 of Fig. 1.

Fig. 4 is an enlarged fragmentary vertical sectional view taken in the plane represented by the line 4—4 of Fig. 2.

The form of my invention shown in the drawing includes an outer tubular body 11 having means at its upper end for connecting with a drilling string 14. In the particular case illustrated a threaded pin 12 is provided on the upper end of the body 11 to receive a coupling or collar 13 which is in turn screwed onto the lower end of the tubular string 14. The tubular elongate body 11 has a central longitudinal bore 15 extending through it from one end to the other. The bore 15 is longitudinally splined through the major portion of its length to provide longitudinal grooves 18. The lower ends of the grooves 18 are closed by a ring or sleeve 20 threaded into a counterbore 21 at the lower end of the bore 15. The ring or sleeve 20 has a lower end portion 22 projecting below the lower end 23 of the tubular body 11. The invention further provides a tubular body or member 24 telescopically related to the body 11. In the form of the invention disclosed the tubular member 24 is within the bore 15 of the body 11 and is shiftable longitudinally relative to the body 11. The inner tubular body or member is provided with longitudinal ribs 25 to cooperate with the longitudinal grooves 18 of the body 11. The ribs 25 are substantially intermediate the ends of the member 24 being located between the upper end portion 26 and the lower end portion 27 of the inner tubular member 24. Packing means 30 is provided in a counterbore 31 at the upper end of the main bore 15 to seal about the said upper portion 26. The packing means 30 includes a lower ring 32 which closes the upper ends of the longitudinal grooves 18, an annular body of packing material 33, an upper ring 34, and a ring nut 35 cooperating with internal threads 36 in the upper portion of the counterbore 31. The body of packing material 33 is compressed between the rings 32 and 34 by the action of the nut 35 to effectively seal about the portion 26 of the member 24. The lower end 37 of the member 24 may be rounded or convex, as shown in Figs. 1 and 2.

In accordance with the invention a cutter 40 is provided on the lower end of the inner body or member 24. The cutter 40 may comprise two blades 47 and 48. In the typical structure illustrated a transverse slot 38 is provided in the lower end of the member 24 to receive the blades 47 and 48. A screw 41 is received in a threaded opening 42 in the lower end portion of the member 24 and passes through a hole 43 in the central part of the cutter 40 to secure the cutter to the member 24. A circulation passage 44 extends longitudinally through the member 24 from the upper end thereof to a point adjacent its lower end 37. Ports or passages 46 extend downwardly and outwardly from the lower end of the passage 44 to discharge streams of drilling fluid in front of the blades 47 and 48 relative to the direction of rotation of the tool.

A cutter 54 is provided on the lower end of the outer body 11 to cut the well bore 65 to gauge. The cutter 54 comprises blades 53 projecting downwardly and outwardly from the lower end of the body 11. Lugs 50 project outwardly from the lower end portion of the body 11 to receive bolts 51 on extensions 52 of the cutter blades 53. The bolts 51 have suitable nuts and secure the blades 53 to the body 11. The blades 53 are carried by or connected by a shoe or ring 55 which is preferably formed or cast integrally with the blades. The ring 55 is adapted to fit and bear upwardly against the lower end face of the body 11, as shown in Figs. 1 and 2. The ring 55 fits around the lower portion 27 of the inner member 24 and has a counterbore 56 in its upper end to receive the downwardly extending end portion 22 of the threaded ring 20. The cooperation of the counterbore 56 with the projecting end portion 22 of the ring 20 may centralize the cutter 54. As shown in Fig. 2, the inner cutter 40 is of such width that the blades 47 and 48 thereof overlap the inner edges 60 of the blades 53 of the outer cutter 54. When the inner member 24 is in its highest position relative to the outer member 11, as shown in Fig. 2, the lower cutting edges 62 and 61 of the inner and outer cutters 40 and 54 lie in a common plane substantially normal to the longitudinal axis of the members 11 and 24.

The operation of the device of the invention is as follows: Let it be assumed that the drilling device is in the well bore 65, whose lower end portion 66 is offset. Under ordinary conditions and when drilling with a typical tool this offsetting would continue, thereby producing a hole of such crookedness that setting of the casing and other operations would be difficult. With my device, however, it is possible to correct the offset condition of the well. To accomplish this the tubular body 11 is first raised by raising the string of drill pipe 14. Upon lifting the body 11 the inner member 24 projects downwardly from the lower end of the outer member 11 through action of gravity or the fluid pressure acting on the upper end of the member 24 or both. The outer member 11 may be raised through a distance greater than the length of the lower portion 27 of the member 24 to lift the inner cutter 40 from the bottom 67 of the well bore, as indicated by dotted lines 68. This allows the cutter 40 to automatically centralize itself on the axis A—A of the portion of the well bore 65 above the offset lower end portion 66. Then, by lowering the drill string 14 and the parts attached thereto, the cutter 40 may be caused to advance vertically downwardly by the action of gravity or fluid pressure or both to move from the position in which it is shown by the broken lines 68 to a position where it engages the bottom 67 of the hole 65. The drilling string 14 is rotated and manipulated to cause the cutter 40 to drill into the formation at the bottom 67 of the bore in the manner shown to form a pilot bore or counterbore 69. The counterbore 69 is eccentric with respect to the lower offset end portion 66 of the bore and is axially aligned with the vertical upper portion of the bore 65. The drilling string 14 may be fed downwardly and this downward movement of the string 14 causes the outer body 11 and the outer cutter 54 to advance downwardly. During this downward advance of the outer cutter 54 the inner cutter continues to operate in the counterbore 69 so that the inner member 24 guides the outer body axially or vertically to continue or extend the main bore 65 vertically as shown by the dotted lines 71, which extension of the main bore is concentric with the axis A—A. When the outer cutter 54 reaches and overlaps the inner cutter 40, they progress downwardly together in overlapped relation as shown in Fig. 2.

In the use of my new drilling device the drilling operation may be conducted by steps or stages. For instance, fifteen feet of hole may be drilled with the inner and outer cutters 40 and 54 in the overlapped relationship as shown in Figs. 1 and 2. The drill string 14 may then be raised to allow the inner member 24 to be extended from the outer body 11 by the hydraulic pressure of drilling mud against the upper end of the inner member 24 or by gravity or both. The inner cutter 40 then drills a pilot bore 69 as the tool is rotated and fed downwardly. After the forming of the pilot bore 69, the guided and centralized outer cutter 54 drills downwardly to extend the main bore 65 and the two cutters 40 and 54 may operate in their nested or overlapping relation to drill another fifteen feet or other selected length of bore. The device may again be raised and the above procedure may be repeated. The drilling may be continued by repeating this process of boring a short length of hole and then forming a pilot bore.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

Having described my invention, I claim:

1. A drilling device of the character described, including: an outer tubular member having its upper end adapted to be secured to the lower end of a string of drill pipe, and having longitudinal grooves in its internal wall; an inner member slidable within said outer member, said inner member having radially projecting ribs adapted to engage said longitudinal grooves, the lower end of said inner member being adapted to receive an inner cutter of a character to make pilot engagement with the bottom of the hole being drilled; a ring fitted into the lower end of said outer tubular member, said ring providing a lower end wall for said grooves in said outer tubular member; and means on the lower end of said outer tubular member adapted to receive an outer cutter member.

2. A drilling device of the character described, including: an outer tubular member having its upper end adapted to be secured to the lower end of a string of drill pipe, and having longitudinal grooves in its internal wall; an inner member slidable within said outer member, said inner member having radially projecting ribs adapted to engage said longitudinal grooves, the lower end of said inner member being adapted to receive an inner cutter of a character to make pilot engagement with the bottom of the hole being drilled; a ring fitted into the lower end of said outer tubular member, said ring providing a lower end wall for said grooves in said outer tubular member; means on the lower end of said outer tubular member adapted to receive an outer cutter member; and an outer cutter member secured to said means on the lower end of said outer tubular member, said outer cutter member having an opening therethrough for the passage of said inner member.

3. A drilling device of the character described, including: an outer tubular member having its upper end adapted to be secured to the lower end of a string of drill pipe, and having internal longitudinal grooves; an inner member slidable within said outer member, said inner member having radially projecting ribs adapted to engage said longitudinal grooves, the lower end of said inner member being adapted to receive an inner cutter of a character to make pilot engagement with the bottom of the hole being drilled; a ring fitted into the lower end of said outer tubular member, said ring providing a lower end wall for said grooves in said outer tubular member; means on the lower end of said outer tubular member adapted to receive an outer cutter member; and an outer cutter member secured to said means on the lower end of said outer tubular member, said outer cutter member having an opening therethrough for the passage of said inner member, the lower cutting edges of said outer cutter member and said inner cutter lying substantially in a radial plane when said inner cutter is in a fully raised position relative to said outer member.

4. A well drilling tool comprising, a tubular body to be connected with a drilling string, said body having internal longitudinal grooves, an elongate member shiftable longitudinally in the body, parts in the body at the opposite ends of the grooves, cutters on the lower ends of the body and member, and ribs on the member cooperable with the grooves for the transmission of rotation and located to engage one of said parts to stop movement of the member in one direction where the cutters are one within the other and to engage the other part to stop movement of the member in the other direction where the cutter of the member is far in advance of the cutter of the body.

5. A well drilling tool comprising, a tubular body for connection with a rotary drilling string, a cutter on the lower end of the body acting only on the outer portion of the well bore, a rigid guide member rotatable with the body and freely slidable in the body between an expanded position where it projects beyond the lower end of the body and a contracted position substantially entirely within the body, a rotary fish tail cutter fixed to the lower end of the member for drilling a pilot bore, means for stopping downward movement of the member relative to the body when the cutter on the member is in the expanded position where its upper end is an appreciable distance below the lower end of the first named cutter, and fluid pressure means for projecting the member from the contracted position where its cutter is within the first named cutter to the expanded position where its cutter may form a pilot bore to assist in preventing lateral movement of the member whereby the member serves as a guide for the first named cutter.

6. A well drilling tool comprising, a tubular body to be connected with a drilling string to be positively rotated and fed thereby, cutting means on the lower end of the body operable to act on the outer portion of the well bore, a rigid guide member rotatable with the body and slidable longitudinally in the body between retracted and expanded positions, a rotary fish tail pilot cutter fixed on the lower end of the member operable to only act on the inner portion of the well bore, and hydraulic means for shifting the member downwardly relative to the body to the expanded position where the pilot cutter is an appreciable distance below the lower end of said cutting means to form a pilot bore and cooperate with the pilot bore to assist in preventing lateral movement of the guide member whereby the guide member serves to guide the said cutting means.

7. A drilling device of the character described, including, an outer tubular member to be secured to the lower end of a string of drill pipe, and having longitudinal grooves in its internal wall, an inner member shiftable longitudinally in said outer member, projecting ribs on the inner member cooperating with said longitudinal grooves, an inner cutter on the lower end of the inner member operable to engage the bottom of the hole being drilled, a part in the lower end of said outer tubular member providing lower end walls for said grooves in said outer tubular member, and an outer cutter on the lower end of said outer tubular member.

8. A drilling device of the character described including, an outer tubular member to be secured to the lower end of a string of drill pipe, and having longitudinal grooves in its internal wall, an inner member shiftable in said outer member, ribs on the inner member cooperating with said longitudinal grooves, an inner cutter on the lower end of the inner member operable to make a pilot bore in the bottom of the hole being drilled, a part in the lower end of said outer tubular member providing lower end walls for said grooves in said outer tubular member, means on the lower end of said outer tubular member to receive an outer cutter, and an outer cutter secured to said means on the lower end of said outer tubular member, said outer cutter having an opening therethrough for the passage of said inner member.

9. A drilling device of the character described including, an outer tubular member to be secured to the lower end of a string of drill pipe, and having internal longitudinal grooves, an inner member shiftable in said outer member, ribs on the inner member cooperating with said longitudinal grooves, an inner cutter on the lower end of said inner member to make a pilot bore in the bottom of the hole being drilled, a part in the outer tubular member providing lower end walls for said grooves, means on the lower end of said outer tubular member to receive an outer cutting means, and an outer cutting means secured to said means on the lower end of said outer tubular member, said outer cutting means having an opening therethrough for the passage of said inner member, the lower cutting edges of said outer cutting means and said inner cutter lying in a common plane when said inner cutter is in a fully raised position relative to said outer member.

VORT E. STROUD.